(12) United States Patent
Hayashi

(10) Patent No.: US 7,569,999 B2
(45) Date of Patent: Aug. 4, 2009

(54) MOTOR CONTROL DEVICE

(75) Inventor: Kensuke Hayashi, Utsunomiya (JP)

(73) Assignee: OMRON Corporation, Kyoto (JP)

( * ) Notice: Subject to any disclaimer, the term of this patent is extended or adjusted under 35 U.S.C. 154(b) by 202 days.

(21) Appl. No.: 11/843,798

(22) Filed: Aug. 23, 2007

(65) Prior Publication Data
US 2008/0048592 A1  Feb. 28, 2008

(30) Foreign Application Priority Data
Aug. 23, 2006  (JP) ............................. 2006-227086

(51) Int. Cl.
H02P 1/54 (2006.01)
(52) U.S. Cl. ...................... 318/34; 318/69; 318/286; 318/434; 318/466
(58) Field of Classification Search .................. 318/34, 318/38, 62, 66, 69, 286, 434, 461, 466–469
See application file for complete search history.

(56) References Cited

U.S. PATENT DOCUMENTS

| 5,530,329 | A  | * | 6/1996 | Shigematsu et al. | ......... 318/469 |
| 6,445,147 | B1 |   | 9/2002 | Saitoh et al. | |
| 6,825,623 | B2 | * | 11/2004 | Onozawa et al. | ............ 318/257 |
| 6,943,515 | B2 | * | 9/2005 | Kidokoro | ................. 318/466 |
| 7,170,244 | B2 | * | 1/2007 | Choby | ........................ 318/280 |
| 7,309,971 | B2 | * | 12/2007 | Honma et al. | .............. 318/466 |

FOREIGN PATENT DOCUMENTS

| JP | 2001-051722 A | 2/2001 |
| JP | 3467440 B2 | 8/2003 |
| JP | 3550114 B2 | 4/2004 |

OTHER PUBLICATIONS

Patent Abstracts of Japan, Publication No. 2001-051722, Publication Date Feb. 23, 2001, 2 pages.

* cited by examiner

*Primary Examiner*—Bentsu Ro
*Assistant Examiner*—Thai Dinh
(74) *Attorney, Agent, or Firm*—Osha • Liang LLP

(57) ABSTRACT

A motor control device has a target speed generating unit for generating a generated target rotational speed, speed detecting units for detecting rotational speeds of each of the plurality of motors, an average speed calculating unit for averaging the detected rotational speeds of each of the plurality of motors to calculate an average rotational speed, a drive command value output unit for outputting a drive command value to each of the plurality of motors based on the generated target rotational speed and the average rotational speed, rotation amount detecting units for detecting the rotation amounts of each of the plurality of motors, an average rotation amount calculating unit for averaging the detected rotation amounts of each of the plurality of motors to calculate an average rotation amount, and drive command value changing units for generating a feedback signal for rotation amount control corresponding to each of the plurality of motors based on the average rotation amount and the detected rotation amounts, and changing the drive command value to be provided to each of the plurality of motors from the drive command value output unit based on the feedback signal.

5 Claims, 3 Drawing Sheets

MOTOR CONTROL DEVICE

BACKGROUND OF THE INVENTION

1. Field of the Invention

The present invention relates to motor control devices for performing synchronous control such that rotational speeds and rotation amounts of a plurality of motors become equal.

2. Description of the Related Art

In a convertible vehicle having a roof that can be freely opened and closed on the upper part of a vehicle compartment, the roof being folded and accommodated in a back trunk, a movable body such as roof and trunk is moved by rotating two motors arranged on the right and the left. However, when the rotational speeds and the rotation amounts (rotation angles) of the two motors differ due to variation in motor properties, variation in friction force of a link mechanism driven by the motors or difference in load of the motors caused by the tilt of the vehicle body, imbalanced force acts on the movable body, whereby the movable body may be deformed, or in an extreme case, broken.

A control device that performs control such that the rotational speeds and the rotation amounts of the two motors become equal is proposed in Japanese Patent No. 3467440, Japanese Patent No. 3550114, and Japanese Patent Application Laid-Open No. 2001-51722. In Japanese Patent No. 3467440, a target position after the lapse of a unit time is calculated from a current position and a target speed of each motor, a predictive position after the lapse of the unit time is calculated from the current position and a current speed of each motor, and the output amount of the motor is determined by comparing the calculated target position and the predictive position, so that control can be performed to have the predictive positions of the respective motors gradually approach a common target position thereby suppressing positional shift between the motors. In Japanese Patent No. 3550114, speed control similar to a conventional technique is performed on a first motor, and position control is performed on a second motor instead of the speed control with an absolute value of the rotation angle of the first motor as a reference so that the second motor synchronizes and follows the absolute value of the first motor thereby suppressing positional shift between the motors. In Japanese Patent Application Laid-Open No. 2001-51722, the two motors are controlled such that the rotational speeds are matched and the operation is stabilized by using means for switching a speed feedback path from an anti-backlash control to speed control according to the rotational speed of the motor.

Since the rotational speeds and the rotation amounts cannot be independently controlled in the conventional motor control device, the rotational speed is influenced when control is performed to eliminate difference in rotation amounts between the two motors, thereby creating a difference in the rotational speeds of the motors. FIG. 3 shows one example of a control result of the rotation amounts of the two motors and tip speed of the movable body driven by the motors. FIG. 3A shows the control result of the rotation amounts of the motors A, B. FIG. 3B shows the control result of the tip speed of the movable body. The tip speed and the target speed are substantially matched, as shown in FIG. 3B, by synchronously controlling the motors A, B so that the rotational speeds become equal. However, in the case where difference is created in the rotation amounts of the motors A, B, as in FIG. 3A, even when synchronous control of the rotational speeds is performed, such difference can be resolved by controlling the rotation amount of each motor so that the difference becomes 0, but change in operation amount of the rotation amount influences the operation amount of the rotational speed, whereby a difference is created in the rotational speeds of the motors A, B and the tip speed deviates from the target speed. Therefore, control to eliminate the difference in rotation amount while maintaining the rotational speeds equal between the motors cannot be carried out in conventional techniques.

SUMMARY OF THE INVENTION

In one or more embodiments of the present invention, a motor control device is capable of eliminating difference in rotation amounts between motors while suppressing influence on speed control.

A motor control device according to one or more embodiments of the present invention relates to a motor control device for performing synchronous control such that rotational speeds and rotation amounts of a plurality of motors become equal, the motor control device including a target speed generating unit for generating a target speed or target value of the rotational speed; speed detecting units for detecting the rotational speeds of the respective motors; an average speed calculating unit for averaging the rotational speeds of the respective motors detected by the speed detecting units to calculate an average speed; a drive command value output unit for outputting a drive command value to the respective motors based on the target speed generated by the target speed generating unit and the average speed calculated by the average speed calculating unit; rotation amount detecting units for detecting the rotation amounts of the respective motors; an average rotation amount calculating unit for averaging the rotation amounts of the respective motors detected by the rotation amount detecting units to calculate an average rotation amount; and drive command value changing units for generating a feedback signal for rotation amount control corresponding to each motor based on the average rotation amount calculated by the average rotation amount calculating unit and the rotation amounts of the respective motors detected by the rotation amount detecting units, and changing the drive command value to be provided to each motor from the drive command value output unit based on the feedback signal.

In one or more embodiments of the present invention, the rotational speeds of a plurality of motors are detected and the average (average speed) thereof is calculated, and furthermore, the rotation amounts of a plurality of motors are detected and the average (average rotation amount) thereof is calculated. Regarding the rotational speed, each motor is controlled to operate at the target speed and rotated at the same speed by providing to each motor a drive command value calculated based on the target speed and the average speed. Regarding the rotation amount, the feedback signal is generated for each motor based on the calculated average rotation amount and the rotation amount of each motor, and control of the rotation amount is individually performed on each motor by changing the drive command value provided to each motor by the feedback signal. Therefore, the difference in rotation amounts is eliminated by independently controlling the rotation amounts while reducing the influence on the rotational speed to as little as possible. Since the rotational speeds and the rotation amounts are both made equal among the plurality of motors, imbalanced force will not act on the movable body when, for example, moving one movable body with two motors, thereby preventing the movable body from deforming or breaking.

According to one or more embodiments of the present invention, a motor control device is obtained in which the difference in the rotation amounts between the motors is eliminated while reducing the influence on the speed control as little as possible.

DETAILED DESCRIPTION OF THE PREFERRED EMBODIMENTS

Figure 1:
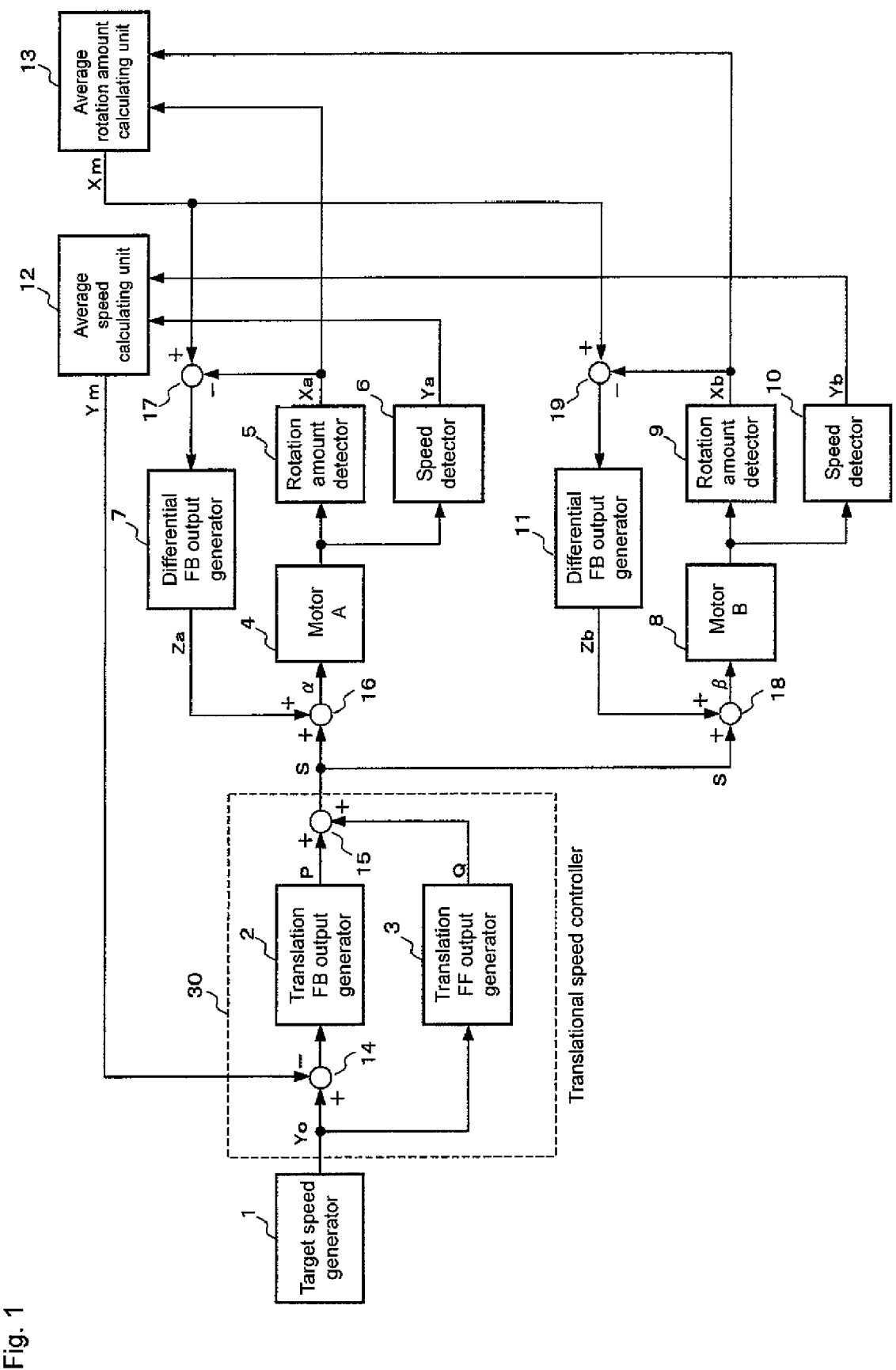
FIG. 1 shows a control block diagram of a motor control device according to one or more embodiments of the present invention.

FIG. 1 shows a control block diagram of a motor control device according to one or more embodiments of the present invention. A target speed generator 1 for generating target speed (target value of rotational speed) includes a target speed table in which a target speed corresponding to a position of a movable body is set in advance. A translational speed controller 30 for controlling rotational speeds of two motors 4, 8 is configured by a translation FB (feed back) output generator 2, a translation FF (feed forward) output generator 3, a calculator 14, and a calculator 15. The translation FB output generator 2 performs control such that the rotational speeds of the motors 4, 8 become equal, and is configured by a proportional element for outputting a signal proportional to an inputted deviation, and an integrator element for outputting a signal proportional to a time integration value of the deviation. The translation FF output generator 3 includes a feed forward element for outputting a speed value equal to the target speed. Thus, a satisfactory response property with respect to the target value can be obtained by combining the feed forward operation with the proportional operation and the integration operation. In the translation FB output generator 2, a differentiation element may be added to the proportional element and the integration element to perform PID control. The translation FF output generator 3 is not essential to the present invention and may be omitted.

One of the motors (motor A) 4 moves the movable body, a rotation amount detector 5 detects the rotation amount (rotation angle) of the motor 4, and a speed detector 6 detects the rotational speed of the motor 4. The detectors 5, 6 may be configured using one rotary encoder for generating a pulse synchronized with the rotation of the motor 4. A differential FB (feed back) output generator 7 generates a feedback signal for rotation amount control with respect to the motor 4 and outputs the same. The other motor (motor B) 8 moves the movable body, a rotation amount detector 9 detects the rotation amount (rotation angle) of the motor 8, and a speed detector 10 detects the rotational speed of the motor 8. The detectors 9, 10 may also be configured using one rotary encoder for generating a pulse synchronized with the rotation of the motor 8. A differential FB (feed back) output generator 11 generates a feed back signal for rotation amount control with respect to the motor 8 and outputs the same. The differential FB output generators 7, 11 are configured by the proportional element, the integration element, and the like described above. The motors 4 and 8 are arranged on the left and the right of the movable body such as roof and trunk of the vehicle, so that one movable body is moved by the rotation of the two motors 4, 8 by way of a link mechanism (not shown) that operates in cooperation with each motor.

An average speed calculating unit 12 averages the rotational speeds of the motors 4, 8 detected by the speed detectors 6, 10 to calculate an average speed. An average rotation amount calculating unit 13 averages the rotation amounts of the motors 4, 8 detected by the rotation amount detectors 5, 9 to calculate an average rotation amount. The calculator 14 calculates a difference between the target speed outputted from the target speed generator 1 and the average speed outputted from the average speed calculating unit 12. The calculator 15 adds the output of the translation FB output generator 2 and the output of the translation FF output generator 3. A calculator 16 adds the output of the calculator 15, that is, the output of the translational speed controller 30 and the output of the differential FB output generator 7. A calculator 17 calculates a difference between the output of the average rotation amount calculating unit 13 and the output of the rotation amount detector 5. A calculator 18 adds the output of the calculator 15, that is, the output of the translational speed controller 30 and the output of the differential FB output generator 11. A calculator 19 calculates a difference between the output of the average rotation amount calculating unit 13 and the output of the rotation amount detector 9.

In the above configuration, the target speed generator 1 constitutes a target speed generating unit according to one or more embodiments of the present invention, and the translational speed controller 30 constitutes a drive command value output unit according to one or more embodiments of the present invention. Each rotation amount detector 5, 9 constitutes a rotation amount detecting unit according to one or more embodiments of the present invention, and each speed detector 6, 10 constitutes a speed detecting unit according to one or more embodiments of the present invention. The average speed calculating unit 12 constitutes an average speed calculating unit according to one or more embodiments of the present invention, and the average rotation amount calculating unit 13 constitutes an average rotation amount calculating unit according to one or more embodiments of the present invention. The calculators 16 to 19 and the differential FB output generators 7, 11 configure drive command value changing units according to one or more embodiments of the present invention.

The controlling operation of the motors 4, 8 will now be described. When opening and closing operation of the movable body such as roof is started by operating an operation switch (not shown), a target speed Yo corresponding to the position of the movable body is provided from the target speed generator 1 to the translational speed controller 30. The target speed Yo is inputted to the calculator 14, and a deviation Yo-Ym is calculated from the target speed Yo and an average speed Ym, which is the output of the average speed calculating unit 12. The calculated deviation is inputted to the translation FB output generator 2, and the translation FB output generator 2 performs processes of proportion, integration etc. and outputs a signal corresponding to the deviation. The target speed Yo is also inputted to the translation FF output generator 3 where the feed forward process is performed. The output P of the translation FB output generator 2 and the output Q of the translation FF output generator 3 are added in the calculator 15. The translational speed controller 30 outputs the addition result of the calculator 15 as a drive command value S.

The drive command value S outputted from the translational speed controller 30 is provided to the calculators 16 and 18 as a common command value. In the calculator 16, the drive command value S and a differential signal Za, to be described later, outputted from the differential FB output generator 7 are added, and the addition result S+Za is provided to the motor 4 as a drive command value α. In the calculator 18, the drive command value S and a differential signal Zb, to be described later, outputted from the differential FB output generator 11 are added, and the addition result S+Zb is provided to the motor 8 as a drive command value β.

The motor 4 rotates at a predetermined rotational speed and rotation amount (rotation angle) according to the drive command value α. The rotation amount of the motor 4 is detected by the rotation amount detector 5, and the rotational speed is detected by the speed detector 6. The rotation amount Xa detected by the rotation amount detector 5 is provided to the average rotation amount calculating unit 13 and the calculator 17. The rotational speed Ya detected by the speed detector 6 is provided to the average speed calculating unit 12.

The motor 8 rotates at a predetermined rotational speed and rotation amount (rotation angle) according to the drive command value β. The rotation amount of the motor 8 is detected by the rotation amount detector 9, and the rotational speed is detected by the speed detector 10. The rotation amount Xb detected by the rotation amount detector 9 is provided to the average rotation amount calculating unit 13 and the calculator 19. The rotational speed Yb detected by the speed detector 10 is provided to the average speed calculating unit 12.

The average speed calculating unit 12 calculates an average speed Ym based on the rotational speeds Ya, Yb of the motors 4, 8 outputted from the speed detectors 6, 10. The average speed Ym is obtained from:

$$Ym=(Ya+Yb)/2$$

Here, the average speed Ym is calculated as an arithmetic mean (arithmetic average) of Ya and Yb, but may be calculated through other methods. For instance, when calculated as geometrical mean (geometrical average), the average speed Ym is obtained from:

$$Ym=(Ya \cdot Yb)^{1/2}$$

The calculated average speed Ym is provided from the average speed calculating unit 12 to the calculator 14 of the translational speed controller 30 as a speed control amount for feedback. The calculator 14 calculates the deviation Yo−Ym of the target speed Yo and the average speed Ym, as described above. The deviation is provided to the translation FB output generator 2, and the translation FB output generator 2 performs processes of proportion, integration etc. on the deviation. The output P of the translation FB output generator 2 is added to the output Q of the translation FF output generator 3 in the calculator 15, and the drive command value S corresponding to the deviation is outputted from the translational speed controller 30. The drive command value S is commonly provided to each motor 4, 8, so that each motor 4, 8 is synchronous-controlled such that the respective rotational speeds become equal to the target speed Yo by the drive command value S.

The average rotation amount calculating unit 13 calculates an average rotation amount Xm based on the rotation amounts Xa, Xb of the motors 4, 8 outputted from the rotation amount detectors 5, 9. The average rotation amount Xm is obtained from:

$$Xm=(Xa+Xb)/2$$

Here, the average rotation amount Xm is calculated as an arithmetic mean (arithmetic average) of Xa and Xb, but may be calculated through other methods. For instance, when calculated as geometrical mean (geometrical average), the average rotation amount Xm is obtained from:

$$Xm=(Xa \cdot Xb)^{1/2}$$

The calculated average rotation amount Xm is commonly provided to the calculators 17, 19. The calculator 17 calculates the deviation Xm−Xa of the average rotation amount Xm and the rotation amount Xa of the motor 4 detected by the rotation amount detector 5. The calculation result is provided to the differential FB output generator 7. The differential FB output generator 7 outputs a differential signal Za corresponding to the deviation. The differential signal Za is provided to the calculator 16 as a feedback signal for rotation amount control on the motor 4, and the calculator 16 adds the drive command value S to the differential signal Za. The drive command value provided to the motor 4 is thereby changed, and the motor 4 rotates at the rotational speed and the rotation amount corresponding to the drive command value α (=S+Za). In this case, the motor 4 is controlled so that the rotation amount becomes the average rotation amount Xm by the differential signal Za from the differential FB output generator 7.

The calculator 19 calculates the deviation Xm−Xb from the average rotation amount Xm and the rotation amount Xb of the motor 8 detected by the rotation amount detector 9. The calculation result is provided to the differential FB output generator 11. The differential FB output generator 11 outputs a differential signal Zb corresponding to the deviation. The differential signal Zb is provided to the calculator 18 as a feedback signal for rotation amount control on the motor 8, and the calculator 18 adds the drive command value S to the differential signal Zb. The drive command value provided to the motor 8 is thereby changed, and the motor 8 rotates at the rotational speed and the rotation amount corresponding to the drive command value β (=S+Zb). In this case, the motor 8 is controlled so that the rotation amount becomes the average rotation amount Xm by the differential signal Zb from the differential FB output generator 11.

In the present embodiment, the respective rotational speeds of the motors 4, 8 are detected by the speed detectors 6, 10, the average thereof is calculated by the average speed calculating unit 12, and the common drive command value S is outputted from the translational speed controller 30 for each motor 4, 8 based on the deviation of the calculated average speed Ym and the target speed Yo. The motors 4, 8 are controlled so that the rotational speeds thereof become the target speed by the drive command value S, whereby the motors 4, 8 rotate at the same speed.

Furthermore, in the present embodiment, the rotation amounts of the motors 4, 8 are detected by the rotation amount detectors 5, 9, respectively, the average thereof is calculated by the average rotation amount calculating unit 13, the differential signals Za, Zb based on the deviation of the calculated average rotation amount Xm and each of the detected rotation amounts Xa, Xb of each motor are generated, and the feedback signal for rotation amount control is individually provided to the respective motors 4, 8. Thus, the motor 4 is controlled according to the drive command value α based on the drive command value S and the differential signal Za, and the motor 8 is controlled according to the drive command value β based on the drive command value S and the differential signal Zb. The rotation amount of each motor can be independently controlled by providing individual feedback signals (differential signals Za, Zb) to the motors 4, 8. Therefore, the rotation amounts of the two motors are made equal without influencing (or influencing as little as possible) the rotational speeds by controlling the rotation amounts of the motors 4, 8 to be the average rotation amount Xm, thereby eliminating the difference in the rotation amounts between the motors.

As described above, the average value of the rotational speeds of the motors 4, 8 is obtained and fed back to the target speed, and the two motors are synchronous-controlled by the translational speed controller 30, so that the rotational speed of each motor 4, 8 becomes equal. Furthermore, the average value of the rotation amounts of the motors 4, 8 is obtained, the differential signals Za, Zb based on the deviation of the average value and the rotation amount of each motor 4, 8 are generated, and the rotation amounts of the motors 4, 8 are individually controlled, whereby the rotation amounts of the motors 4, 8 become equal while suppressing the influence on the rotational speed. As a result of the rotational speed and the rotation amount of the two motors becoming the same, imbalanced force is prevented from acting on the movable body thereby preventing deformation and breakage of the movable body when moving one movable body with the motors 4, 8.

Figure 2A:
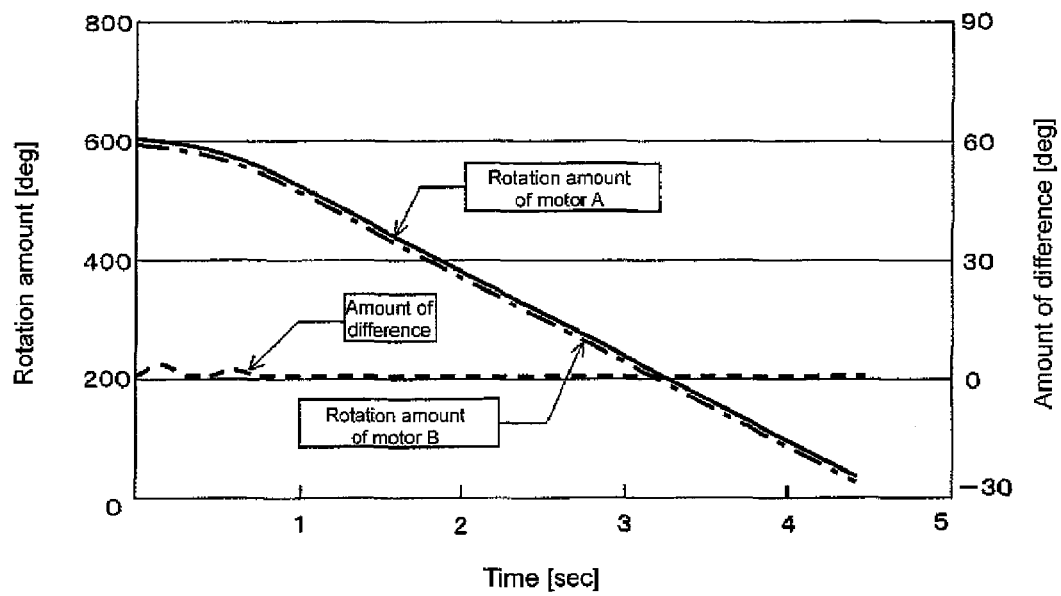
FIG. 2 shows a view of one example of a control result of rotation amounts of motors and tip speed of a movable body in one or more embodiments of the present invention.
Figure 2B:
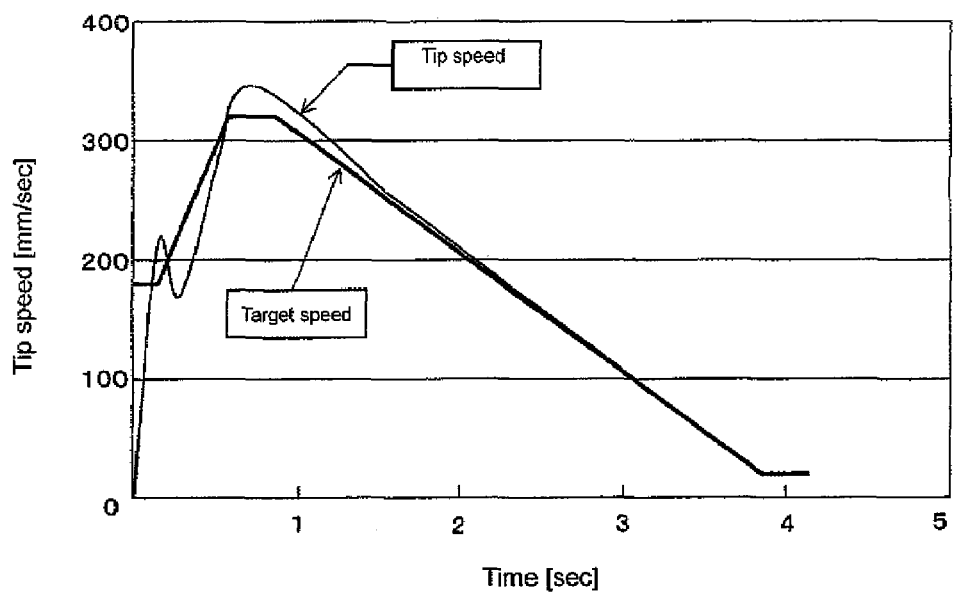
Figure 3A:
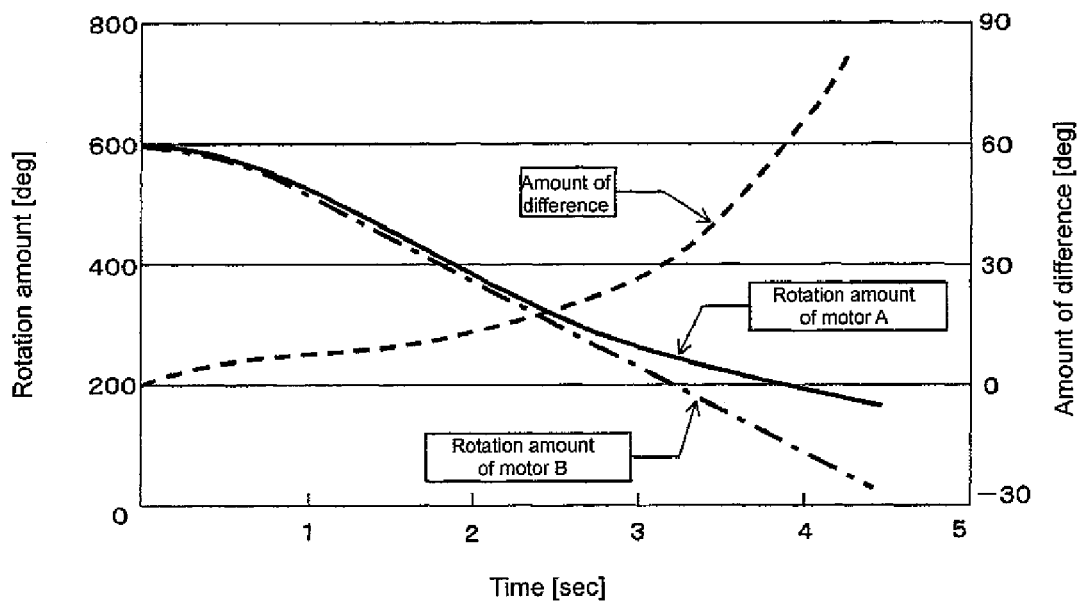
FIG. 3 shows a view of one example of a control result of rotation amounts of motors and tip speed of a movable body in the background art.
Figure 3B:
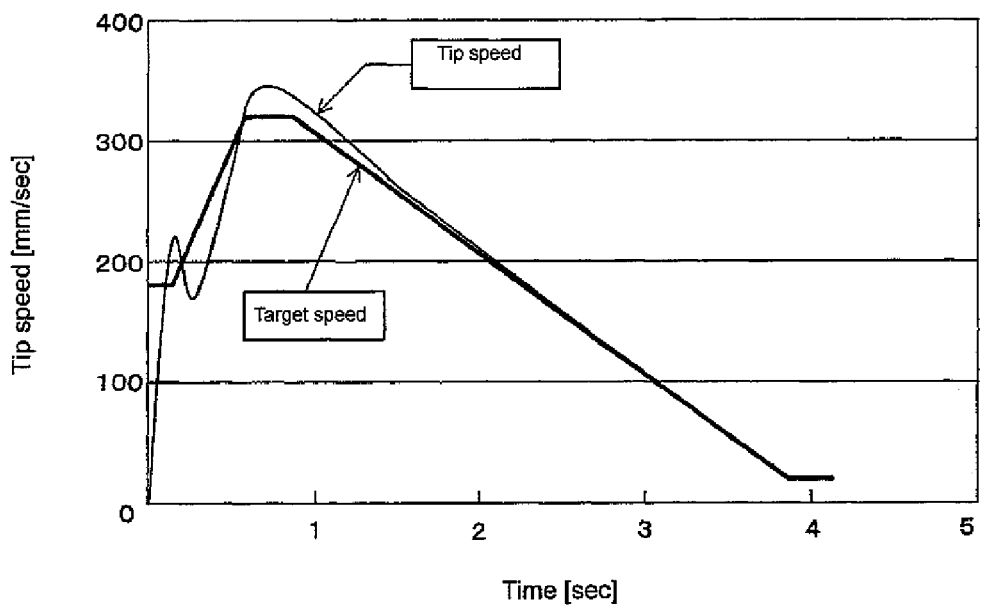

FIG. 2 shows one example of a control result of the rotation amounts of the two motors and the tip speed of the movable body driven by the motors in the motor control device of FIG. 1. FIG. 2A shows the control result of the rotation amounts of the motor A (motor 4) and the motor B (motor 8), and FIG. 2B shows the control result of the tip speed of the movable body. The tip speed barely changes compared to the case of FIG. 3B as shown in FIG. 2B when the rotation amounts of the two motors are controlled such that difference is barely created in the rotation amounts of the motors A, B as shown in FIG. 2A, and control can be so performed as to eliminate the difference in the rotation amounts while maintaining the rotational speeds of the motors at the target value.

A case where synchronous control is performed on the two motors 4, 8 has been described in one or more embodiments described above, but the present invention is similarly applicable to a case where synchronous control is performed on three or more motors.

The motor control device used for opening and closing a roof, a trunk, and the like of a vehicle has been given as an example in one or more embodiments described above, but the present invention is not limited thereto, and may be applied when driving the movable body such as loading platform of a dumper truck.

what is claimed is:

1. A motor control device for performing synchronous control such that rotational speeds and rotation amounts of a plurality of motors become equal, the motor control device comprising:
    a target speed generating unit for generating a generated target rotational speed;
    speed detecting units for detecting rotational speeds of each of the plurality of motors;
    an average speed calculating unit for averaging the detected rotational speeds of each of the plurality of motors to calculate an average rotational speed;
    a drive command value output unit for outputting a drive command value to each of the plurality of motors based on the generated target rotational speed and the average rotational speed;
    rotation amount detecting units for detecting the rotation amounts of each of the plurality of motors;
    an average rotation amount calculating unit for averaging the detected rotation amounts of each of the plurality of motors to calculate an average rotation amount; and
    drive command value changing units for generating a feedback signal for rotation amount control corresponding to each of the plurality of motors based on the average rotation amount and the detected rotation amounts, and changing the drive command value to be provided to each of the plurality of motors from the drive command value output unit based on the feedback signal.

2. A sunroof opening and closing system for a vehicle comprising the motor control device of claim 1.

3. A trunk opening and closing system for a vehicle comprising the motor control device of claim 1.

4. A motor control method for performing synchronous control such that rotational speeds and rotation amounts of a plurality of motors become equal, the motor control method comprising:
    generating a generated target rotational speed;
    detecting rotational speeds of each of the plurality of motors;
    averaging the detected rotational speeds of each of the plurality of motors to calculate an average rotational speed;
    outputting a drive command value to each of the plurality of motors based on the generated target rotational speed and the average rotational speed;
    detecting the rotation amounts of each of the plurality of motors;
    averaging the detected rotation amounts of each of the plurality of motors to calculate an average rotation amount; and
    generating a feedback signal for rotation amount control corresponding to each of the plurality of motors based on the average rotation amount and the detected rotation amounts, and changing the drive command value to be provided to each of the plurality of motors based on the feedback signal.

5. A motor control device for performing synchronous control such that rotational speeds and rotation amounts of a plurality of motors become equal, the motor control device comprising:
    a target speed generating means for generating a generated target rotational speed;
    speed detecting means for detecting rotational speeds of each of the plurality of motors;
    an average speed calculating means for averaging the detected rotational speeds of each of the plurality of motors to calculate an average rotational speed;
    a drive command value output means for outputting a drive command value to each of the plurality of motors based on the generated target rotational speed and the average rotational speed,
    rotation amount detecting means for detecting the rotation amounts of each of the plurality of motors;
    an average rotation amount calculating means for averaging the detected rotation amounts of each of the plurality of motors to calculate an average rotation amount; and
    drive command value changing means for generating a feedback signal for rotation amount control corresponding to each of the plurality of motors based on the average rotation amount and the detected rotation amounts, and changing the drive command value to be provided to each of the plurality of motors from the drive command value output means based on the feedback signal.

* * * * *